(12) United States Patent
Luo

(10) Patent No.: US 11,418,433 B2
(45) Date of Patent: Aug. 16, 2022

(54) CONTROL METHOD FOR SPANNING TREE PROTOCOL OF EASYMESH NETWORK AND RELATED SYSTEM

(71) Applicant: Realtek Singapore Private Limited, Singapore (SG)

(72) Inventor: Xuan Luo, Singapore (SG)

(73) Assignee: REALTEK SINGAPORE PRIVATE LIMITED, Singapore (SG)

( * ) Notice: Subject to any disclaimer, the term of this patent is extended or adjusted under 35 U.S.C. 154(b) by 0 days.

(21) Appl. No.: 17/068,833

(22) Filed: Oct. 13, 2020

(65) Prior Publication Data

US 2022/0116318 A1 Apr. 14, 2022

(51) Int. Cl.
*H04L 45/48* (2022.01)
*H04L 12/46* (2006.01)
*H04L 45/18* (2022.01)

(52) U.S. Cl.
CPC ............ *H04L 45/48* (2013.01); *H04L 12/462* (2013.01); *H04L 45/18* (2013.01)

(58) Field of Classification Search
CPC ....... H04L 45/48; H04L 12/462; H04L 45/18; H04L 41/12
See application file for complete search history.

(56) References Cited

U.S. PATENT DOCUMENTS

| 6,628,624 B1* | 9/2003 | Mahajan | H04L 45/48 370/252 |
| 2013/0301553 A1* | 11/2013 | Klein | H04W 76/12 370/329 |
| 2014/0192677 A1* | 7/2014 | Chew | H04L 45/48 370/254 |
| 2021/0136868 A1* | 5/2021 | Nakajima | H04W 24/02 |

* cited by examiner

*Primary Examiner* — Kibrom T Hailu
(74) *Attorney, Agent, or Firm* — McClure, Qualey & Rodack, LLP

(57) ABSTRACT

A control method for a spanning tree protocol (STP) of an EasyMesh network, wherein the STP includes a plurality of stations, includes assigning a bridge identification (ID) to each of the plurality of stations to classify the plurality of stations into a plurality of network layers; assigning a first station of the plurality of stations as a root bridge; determining a root port of each of the plurality of stations and a corresponding path cost to the root bridge; and blocking a designated port of a lower station of the plurality of stations at a lower layer of the EasyMesh network, when a network loop is detected.

10 Claims, 4 Drawing Sheets

CONTROL METHOD FOR SPANNING TREE PROTOCOL OF EASYMESH NETWORK AND RELATED SYSTEM

BACKGROUND OF THE INVENTION

1. Field of the Invention

The present disclosure relates to a spanning tree protocol (STP) of an EasyMesh network and a related system, and more particularly, to a control method for STP of an EasyMesh network and related system capable of solving network loops.

2. Description of the Prior Art

Spanning tree protocol (STP) is utilized for solving network loops in an EasyMesh network, which is a link management protocol, provides path redundancy and breaks the network loops. A conventional STP identifies any loops in the network and blocks a port of a station to break the loop in the EasyMesh network. However, when a connection between two ports is connected via wired network and wireless networks, e.g. Wi-Fi 5G or Wi-Fi 2.4G, the blocked port may cause another trouble. More specifically, if the port that STP blocks is a conjunction port with another port, the STP may block the port at an upper layer to break the network loop, such blocking causes the disconnection with another station in the EasyMesh network. Accordingly, the conventional STP misleads to block the unwanted port, and thus improvements are necessary to the prior art.

SUMMARY OF THE INVENTION

The present disclosure provides a control method for a spanning tree protocol (STP) in an EasyMesh network and a related system to break the network loop in the network.

An embodiment of the present disclosure provides a control method for a spanning tree protocol (STP) of an EasyMesh network, wherein the STP includes a plurality of stations, comprises assigning a bridge identification (ID) to each of the plurality of stations to classify the plurality of stations into a plurality of network layers; assigning a first station of the plurality of stations as a root bridge; determining a root port of each of the plurality of stations and a corresponding path cost to the root bridge; and blocking a designated port of a lower station of the plurality of stations at a lower layer of the EasyMesh network, when a network loop is detected.

Another embodiment of the present disclosure provides a system for EasyMesh network of a spanning tree protocol (STP), comprises a root bridge; and a plurality of stations, configured to assign a bridge identification (ID) to each of the plurality of stations to classify the plurality of stations into a plurality of network layers, determine a root port of each of the plurality of stations and a corresponding path cost to the root bridge, and block a designated port of a lower station of the plurality of stations at a lower layer of the EasyMesh network, when a network loop is detected; wherein the root bridge is assigned from the plurality of stations.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
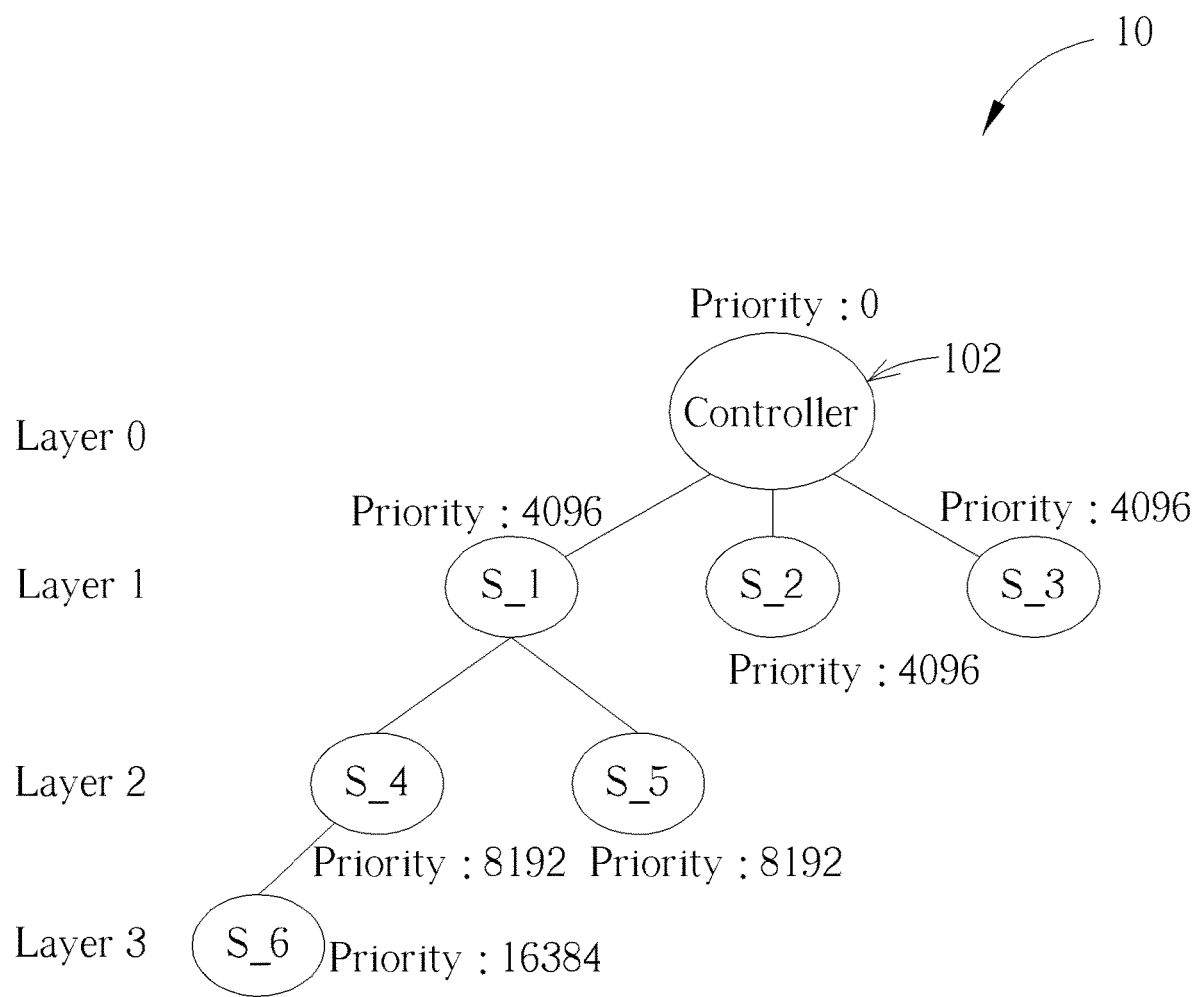
FIG. 1 is a schematic diagram of a system for EasyMesh network according to an embodiment of the present disclosure.

FIG. 1 is a schematic diagram of a system 10 for EasyMesh network according to an embodiment of the present disclosure. The system 10 is of a spanning tree protocol (STP), which includes a controller 102 and a plurality of agent stations S_1-S_6. The controller 102 and each of the agent stations S_1-S_6 are stations of the EasyMesh network. In an embodiment, the controller 102 is assigned from the stations in the EasyMesh network and as a controller of the system 10. The controller 102 and each of the agent stations S_1-S_6 are assigned with a bridge identification (ID), such that the controller 102 and the agent stations S_1-S_6 are classified into a plurality of network layers, e.g. layer 0-3. In an embodiment, the controller 102 is classified into layer 0 and the agent stations S_1-S_6 are classified into layers 1-3, as shown in FIG. 1. Each of the agent stations S_1-S_6 has one root port to join the EasyMesh network, and the rest of active ports of each of the agent stations S_1-S_6 are assigned as designated ports. If the agent station has only one active port, the active port of the agent station is assigned as the root port, and the agent station has no designated port. The root port of each of the agent stations S_1-S_6 and a corresponding path cost to the controller 102 of each of the agent stations S_1-S_6 are determined. As such, at least one designated port of a lower agent station of the agent stations S_1-S_6 at a lower layer of the system 10 is blocked when a network loop is detected. For example, when a network loop is detected between the agent station S_1 and the agent station S_4, a designated port of the agent station S_4 is blocked, since the agent station S_4 is at a lower layer of the system 10. Therefore, a conjunction port at the agent station 1, which connects the agent station S_4 and the agent station S_5, is not blocked. Notably, more than one designated ports are blocked to break the network loop when there are more than one Ethernet connections in the network loop.

The bridge ID is transmitted by a bridge protocol data unit (BPDU), and the bridge ID is related to a priority value of a bridge priority. Different with a conventional BPDU, the bridge ID of the BPDU according to an embodiment of the present disclosure is modified.

Figure 2:
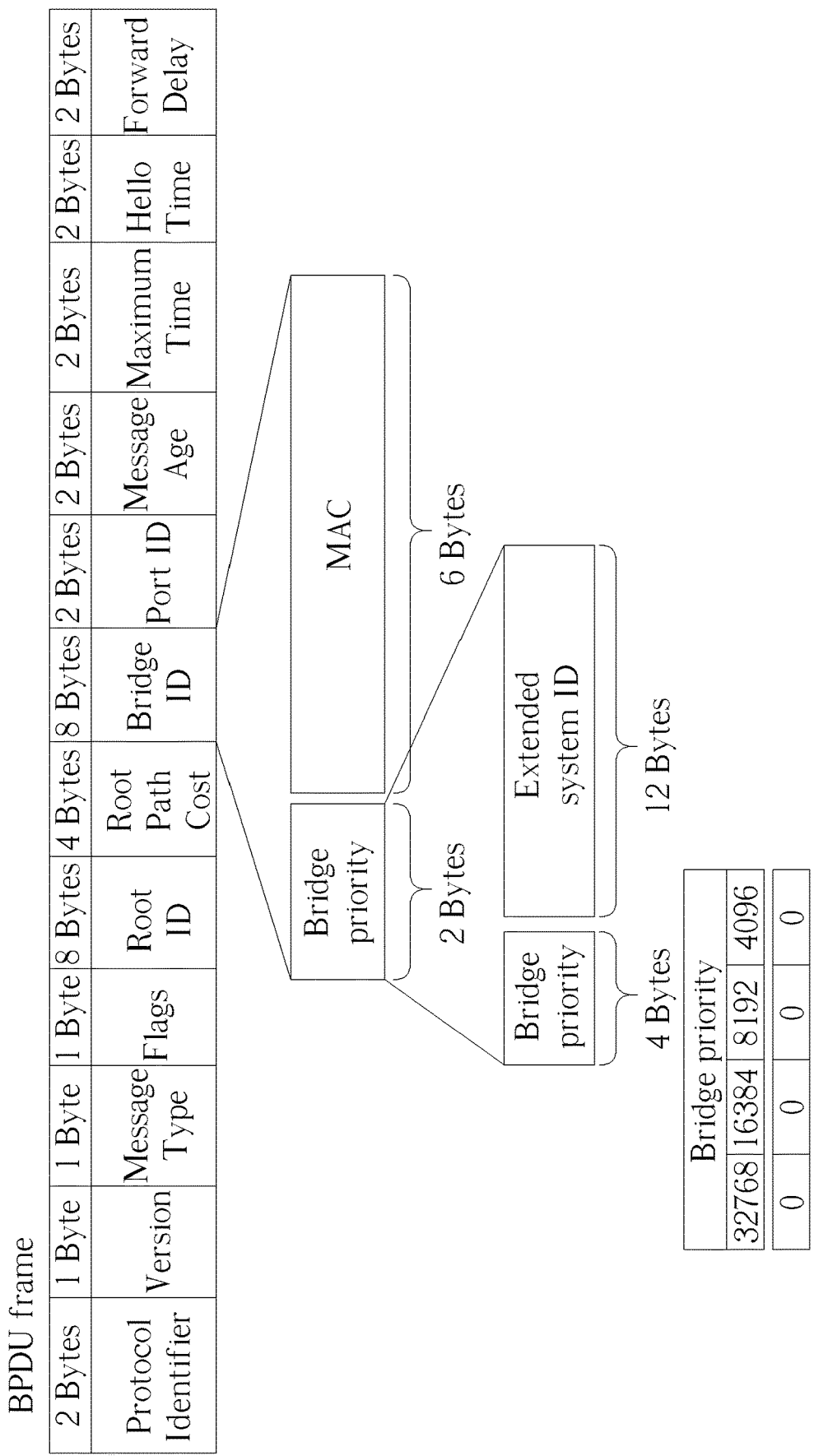
FIG. 2 is a schematic diagram of a BPDU for the system according to an embodiment of the present disclosure.

Please refer to FIG. 2, which is a schematic diagram of the BPDU for the system 10 according to an embodiment of the present disclosure. As shown in FIG. 2, the BPDU is a frame that contains information about the STP, e.g. protocol identifier, version, message type, flags, root ID and so on. The BPDU is sent by the agent stations with a unique source MAC address from its origin port to a destination MAC address. The bridge ID of the BPDU includes a 2-byte bridge priority subframe and a 6-byte MAC subframe, wherein the bridge priority further includes a 4-bit bridge priority field and a 12-bit extended system ID.

In the system 10, the controller 102 has the smallest priority value, which is set to 0 by a user or the system 10, as shown in FIG. 1. The agent stations on upper layer have smaller priority values than that of agent stations on the lower layer, and the agent stations that have the same priority value will be considered as in the same layer. That is, the agent stations S_1, S_2 and S_3 have the same priority value and are classified into the layer 1, the agent stations S_4 and S_5 have the same priority value and are classified into the layer 2, as shown in FIG. 1. The bridge priority field is in increments of 4096, which means that possible values are: 4096, 8192, 12288, 16384, 20480, 24576, 28672, 32768 and etc. Since the priority value is 4 bits, a maximal layer of the system 10 is 16.

When establishing the STP of the system 10, an agent station sets itself as a root bridge until it receives a BPDU from other agent stations with a lower bridge ID, i.e. lower priority value. And the controller 102 is a centralized station in the STP for the system 10 and assigned as a root bridge according to the bridge ID.

Figure 3:
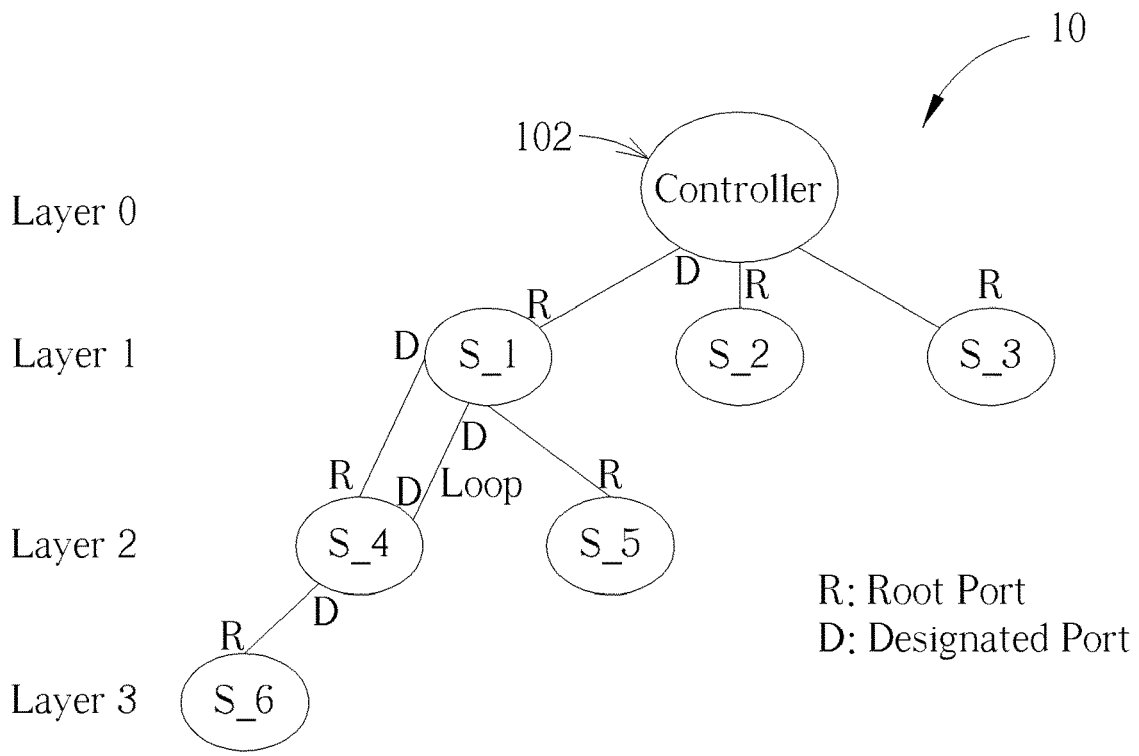
FIG. 3 is a schematic diagram of determining root ports and designated ports of the system according to an embodiment of the present disclosure.

In an embodiment, each of the agent stations S_1-S_6 has only one root port, which is with a lowest root path cost of all active ports of the agent station to the root bridge (i.e. the controller 102) based on a link bandwidth. In an example, the STP classifies the link bandwidth into 4 stages and the lower cost indicates a better connection. For example, a link speed 10 GB/s indicates a path cost 2; a link speed 1 GB/s indicates a path cost 4; a link speed 100 MB/s indicates a path cost 19; a link speed 10 MB/s indicates a path cost 100. After the root port of each of the agent stations S_1-S_6 is selected, the rest ports of each of the agent stations S_1-S_6 are assigned as designated ports. Notably, a port of the agent station cannot be a root port and a designated port at the same time. FIG. 3 is a schematic diagram of determining root ports and designated ports of the system 10 according to an embodiment of the present disclosure.

When two designated ports of the agent stations are connected, i.e. the conjunction port at the agent station 1, the network loop occurs. As shown in FIG. 3, the designated port of agent station S_1 is connected to the designated port of the agent S_4 and the root port of the agent station S_5. One of the ports should be blocked to break the network loop. In this situation, the system 10 compares the bridge ID of two agent stations corresponding to the designated ports. Since an upper priority value of upper agent station is smaller than that of the lower agent station, the designated port on the lower agent station will be blocked. In other words, the priority value of the lower agent station is larger than the priority value of the upper agent station, and thus the designated port of the lower agent station will be blocked.

Figure 4:
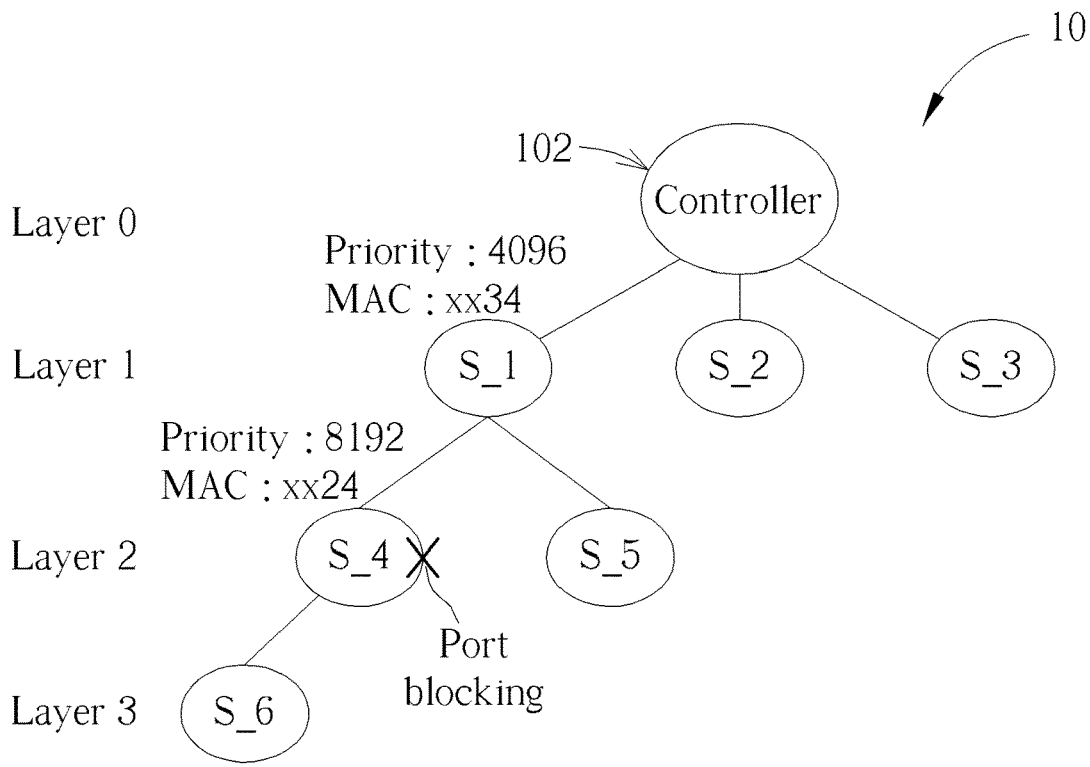
FIG. 4 is a schematic diagram of blocking a designated port of the system according to an embodiment of the present disclosure.

FIG. 4 is a schematic diagram of blocking the designated port of the system 10 according to an embodiment of the present disclosure. As shown in FIG. 4, the network loop between two designated ports of the agent station S_1 and the agent station S_4 occurs. The agent station S_1 has a priority value 4096 and a MAC address of xx34, the agent station S_4 has a priority value 8192 and a MAC address of xx24. By comparing the bridge ID of the agent station S_1 and the agent station S_4, the designated port of the agent station S_4 is with higher priority value than that of the agent station S_1 and the designated port of the agent station S_4 is thereby blocked.

In another embodiment, when two or more designated ports of one agent station are with the same path cost and same bridge ID, a port ID of the ports is compared. The port ID may be assigned by the controller 102 and each of the agent stations S_1-S_6 of the system 10. For example, Ethernet interface gets smaller port ID than Wi-Fi 5G and followed by Wi-Fi 2.4G, e.g. a port number which is connected via the Ethernet interface is 0; a port number which is connected via Wi-Fi 5G is 1; and a port number which is connected via Wi-Fi 2.4G is 2. Accordingly, the agent station prefers to block the wireless ports (e.g. Wi-Fi 5G and Wi-Fi 2.4G) than the Ethernet port, and thus the port ID with larger port ID will be blocked when two or more designated ports of one agent station are with the same path cost and same bridge ID.

Figure 5:
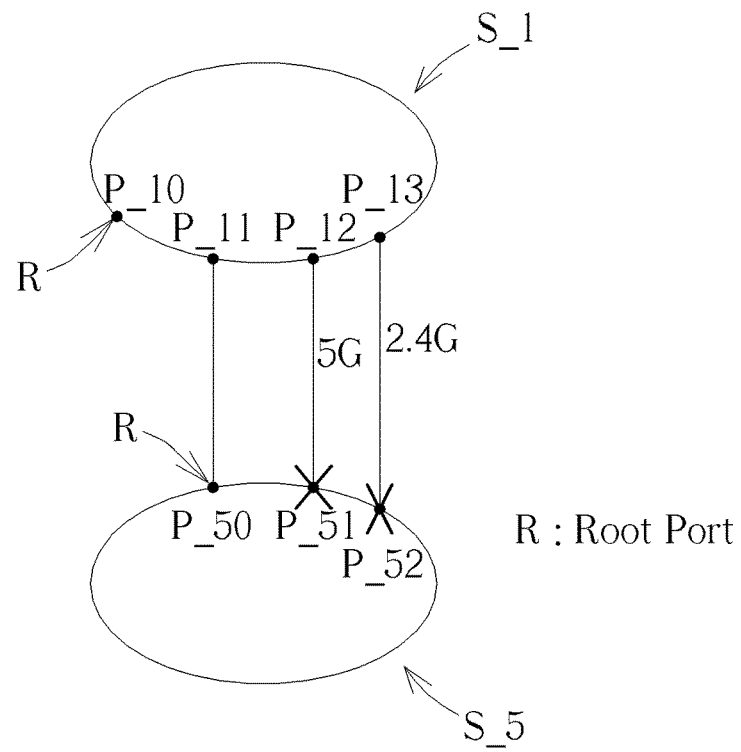
FIG. 5 is a schematic diagram of comparing a port ID of the system according to an embodiment of the present disclosure.

As shown in FIG. 5, assume that the agent station S_1 has ports P_10, P_11, P_12, P_13 and the agent station S_5 has ports P_50, P_51 and P_52 with the same bridge ID and the same path cost to the controller 102. The connections between the agent station S_1 and the agent station S_5 are shown in FIG. 5. The port P_10 is connected to the root bridge (i.e. the controller 102), the port P_11 is connected to the port P_50, the port P_12 is connected to the port P_51 and the port P_13 is connected to the port P_52.

In this example, the root port of the agent station S_1 and the agent station S_5 are selected. The port P_10 is selected as the root port of the agent station S_1. When selecting the root port of the agent station S_5, a designated station of each of active ports of the agent station S_5 is determined, and the path costs corresponding to the active ports are compared when connecting to the same agent station. That is, the path costs of the designated ports P_50, P_51, P_52 are determined. Since the ports P_50, P_51, P_52 are connected to the same station (i.e. the agent station S_1), the path costs are identical, such that the agent station S_5 further checks the port ID of the ports P_50, P_51, P_52. The ports P_51, P_52 are blocked since the port P_50 the agent station S_5 has a lowest port number.

Figure 6:
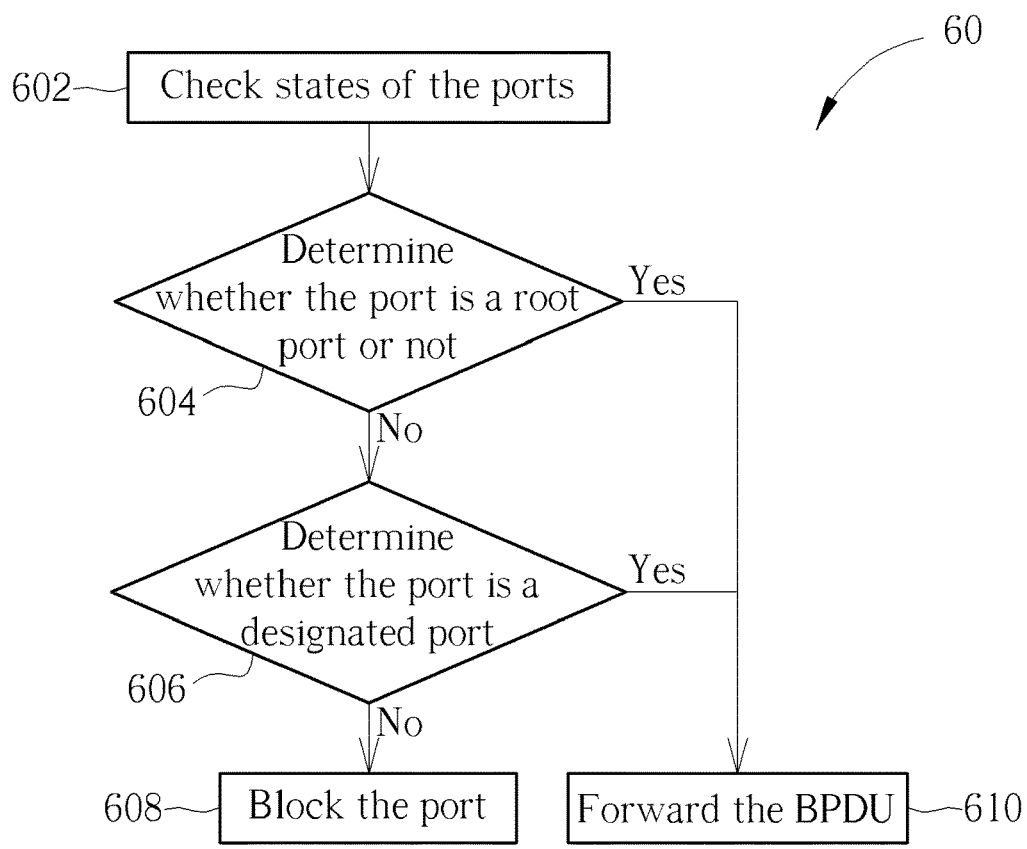
FIG. 6 is a schematic diagram of a control process according to an embodiment of the present disclosure.

Further, when the network loop is detected in the system 10, an operation method of each of the agent stations S_1-S_6 of the system 10 may be summarized as a control process 60 shown in FIG. 6. The control process 60 includes the following steps:

Step 602: Check states of the ports.

Step 604: Determine whether the port is a root port or not. If yes, goes to step 610; if no, goes to step 606.

Step 606: Determine whether the port is a designated port. If yes, goes to step 610; if no, goes to step 608.

Step 608: Block the port.

Step 610: Forward the BPDU.

Regarding the control process 60, in step 602, the states (i.e. a block state, a listen state, a learn state, a forward state or a disable state) of the ports of each of the agent stations S_1-S_6 of the system 10 are constantly checked, e.g. 20 seconds. In step 604, when the port is a root port, the control process 60 goes to step 610 for forwarding the BPDU; otherwise, the control process 60 determines whether the port is a designated port in step 606. Referring to the determination of the designated port of the agent station, the path cost, the bridge ID and the port ID are compared. When the port is a designated port of the agent station, the port is blocked in step 608; or, the BPDU is forwarded in step 610.

Notably, the determination of path cost and port ID of the above embodiments may be modified according to different requirements or variations, which all belong to the scope of the present disclosure.

In summary, the present invention provides a control method for a spanning tree protocol (STP) of an EasyMesh network and a related system, which breaks network loops of the STP in the EasyMesh network without blocking the unwanted port of the agent station.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method for a spanning tree protocol (STP) of an EasyMesh network, wherein the STP includes a plurality of stations, the control method comprising:
   assigning a bridge identification (ID) to each of the plurality of stations to classify the plurality of stations into a plurality of network layers;
   assigning a first station of the plurality of stations as a root bridge;
   determining a root port of each of the plurality of stations and a corresponding path cost to the root bridge;
   blocking a designated port of a lower station of the plurality of stations at a lower layer of the EasyMesh network, when a network loop is detected and;
   comparing a port ID of a plurality of ports of the plurality of stations, when more than two ports of any of the plurality of stations have the same path cost and the same bridge ID, to block a port of the plurality of ports with a largest port number;
   wherein the port ID is related to a network type.

2. The control method for the STP of claim 1, wherein the bridge ID is transmitted by a bridge protocol data unit (BPDU), and the bridge ID is related to a priority value of a bridge priority.

3. The control method for the STP of claim 2, wherein the first station has a lowest priority value of the bridge priority.

4. The control method for the STP of claim 1, wherein the path cost of the root port of each of the plurality of stations to the root bridge is determined based on a link bandwidth, and the root port has a lowest path cost of each of the plurality of stations.

5. The control method for the STP of claim 1, wherein the step of blocking the designated port of the lower station of the plurality of stations at the lower layer of the EasyMesh network when the network loop is detected comprises:
   comparing an upper bridge ID of an upper station of the plurality of stations with a lower bridge ID of the lower station;
   wherein an upper priority value of the upper station is smaller than a lower priority value of the lower station.

6. A system for EasyMesh network of a spanning tree protocol (STP), comprising:
   a root bridge; and
   a plurality of stations, configured to assign a bridge identification (ID) to each of the plurality of stations to classify the plurality of stations into a plurality of network layers, determine a root port of each of the plurality of stations and a corresponding path cost to the root bridge, and block a designated port of a lower station of the plurality of stations at a lower layer of the EasyMesh network, when a network loop is detected;
   wherein the root bridge is assigned from the plurality of stations, and wherein a port ID of a plurality of ports of the plurality of stations are compared, when more than two ports of any of a plurality of stations have the same path cost and the same bridge ID, and a port of the plurality of ports with a largest port number is blocked; and the port ID is related to a network type.

7. The system for EasyMesh network of claim 6, wherein the bridge ID is transmitted by a bridge protocol data unit (BPDU), and the bridge ID is related to a priority value of a bridge priority.

8. The system for EasyMesh network of claim 7, wherein the root bridge has a lowest priority value of the bridge priority.

9. The system for EasyMesh network of claim 6, wherein the path cost of the root port of each of the plurality of stations to the root bridge is determined based on a link bandwidth, and the root port has a lowest path cost of each of the plurality of stations.

10. The system for EasyMesh network of claim 6, wherein an upper bridge ID of an upper station of the plurality of stations with a lower bridge ID of the lower station are compared to block the designated port of the lower station of the plurality of stations at the lower layer of the EasyMesh network when the network loop is detected, wherein an upper priority value of the upper station is smaller than a lower priority value of the lower station.

* * * * *